Nov. 19, 1963     P. GORES     3,111,200
AUTOMATIC BRAKE ADJUSTER
Filed Dec. 4, 1961     4 Sheets-Sheet 1
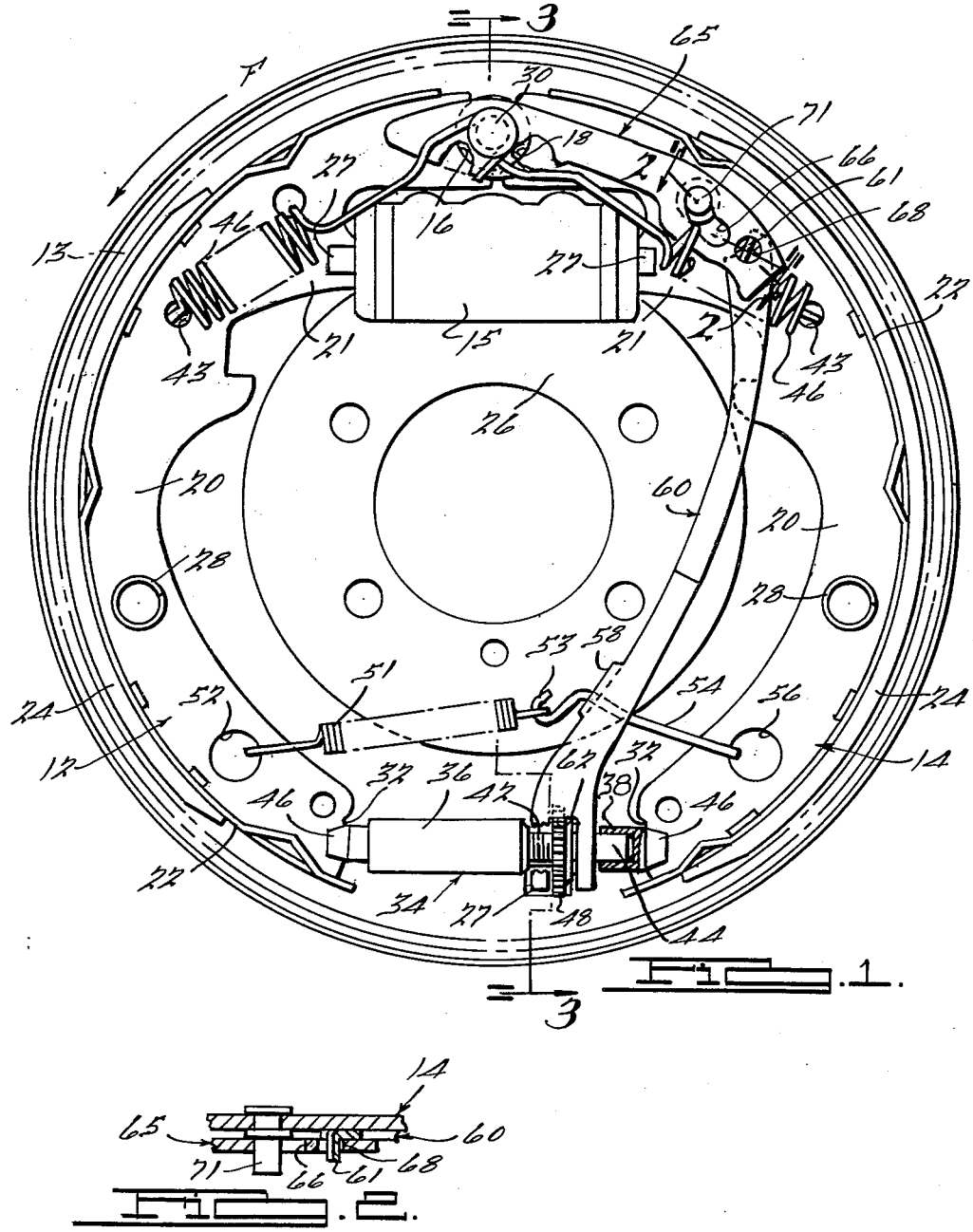
INVENTOR.
*Philip Gores.*
BY
*Harness and Harris*
ATTORNEYS.

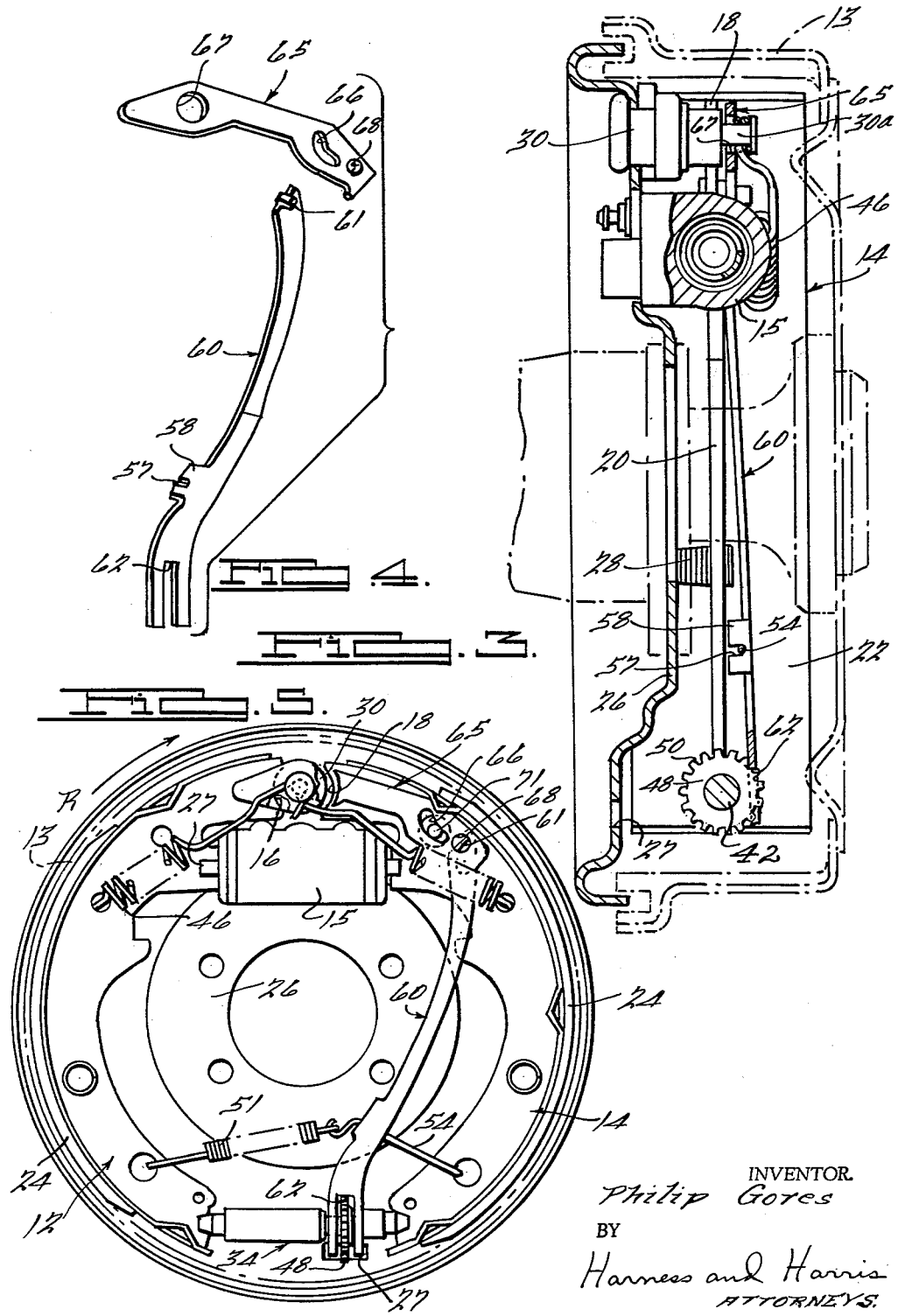

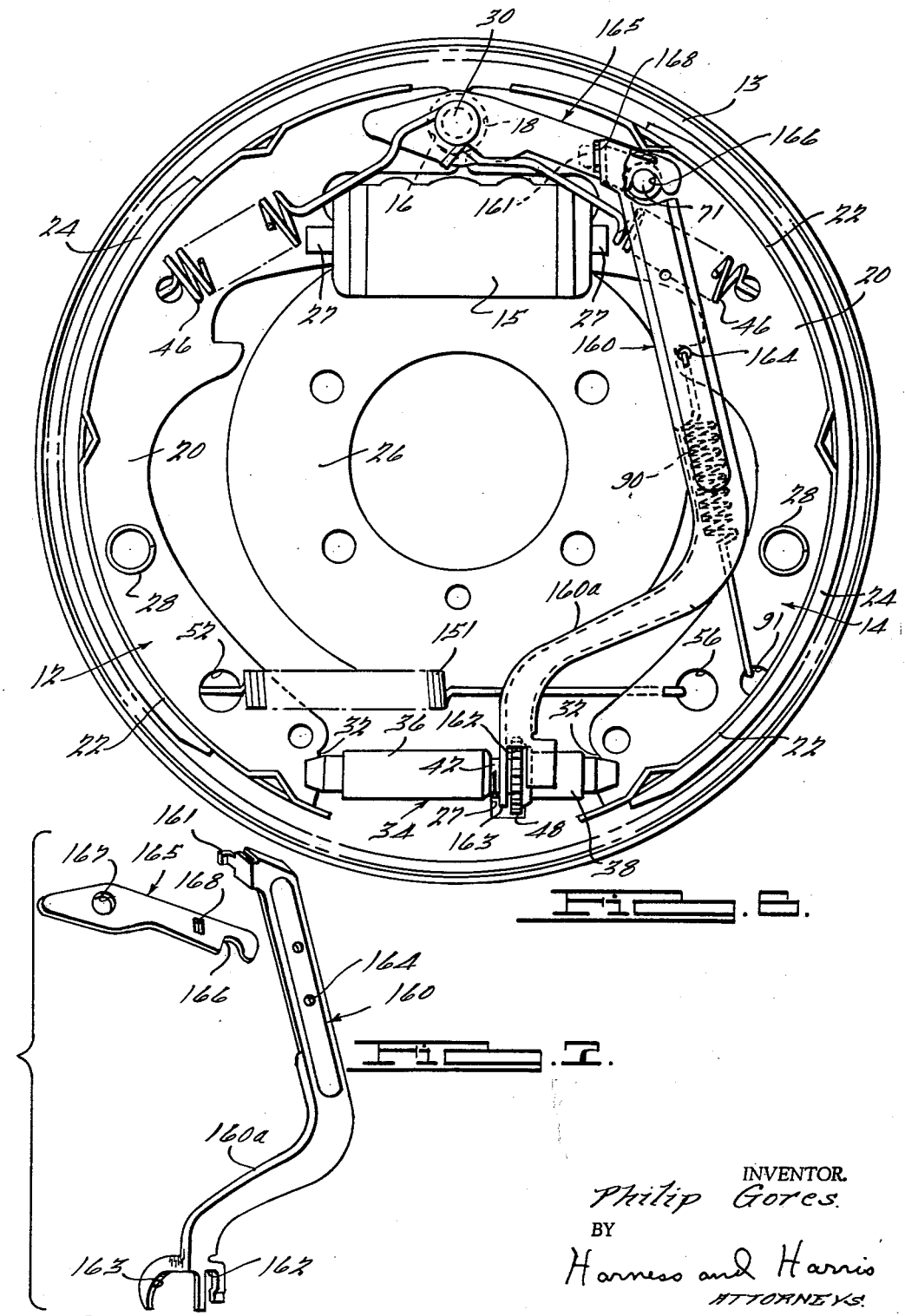

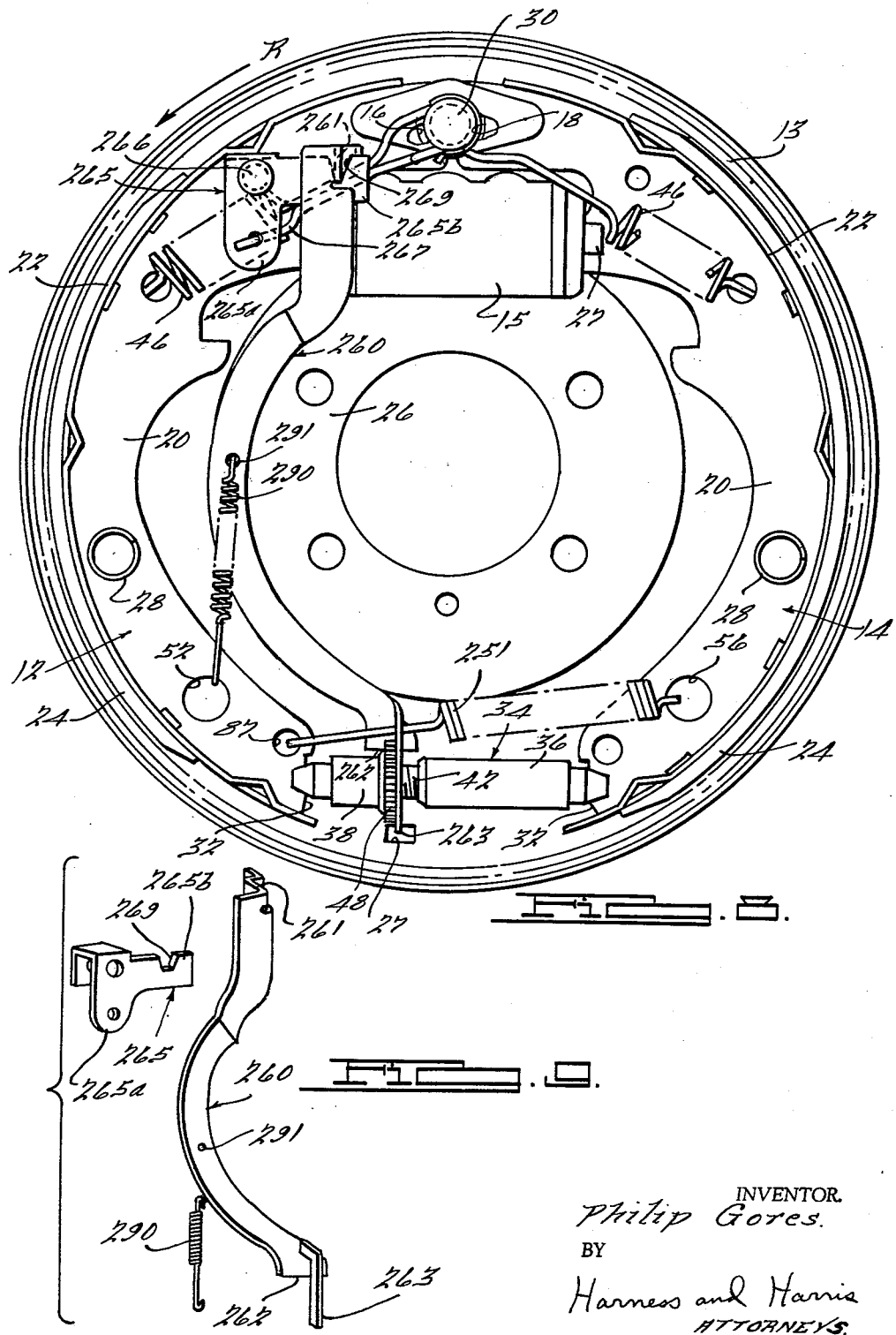

3,111,200
AUTOMATIC BRAKE ADJUSTER
Philip Gores, Royal Oak, Mich., assignor to Chrysler Corporation, Highland Park, Mich., a corporation of Delaware
Filed Dec. 4, 1961, Ser. No. 156,587
5 Claims. (Cl. 188—79.5)

This invention relates to an automatic adjuster for arcuate brake shoes and in the embodiments selected for explanation of the invention, the brake shoes are of the "servo" type in which one brake shoe is used to apply the other. It will be apparent, however, that the invention is not restricted to this particular arrangement of the brake shoes.

It is an object of the invention to provide automatic adjustment for the brake shoes, responsive to wear thereof, at a very nominal cost.

There have been numerous proposed automatic adjusters for vehicle brakes which have proved unsatisfactory either because of inherent operational deficiencies or because of prohibitive cost. Among the operational deficiencies which I have found objectionable is that a part of the braking stress is imposed on the adjuster mechanism, thus making the adjuster prone to failure. In other instances the adjuster is mounted on the brake backing plate rather than being carried by the brake shoes and the relative motion between shoe and backing plate during braking develop problems as the brake shoe lining wears.

I propose an automatic adjuster which is reduced in the number of component parts to approach an ultimate in structural simplicity. It is further provided that the automatic adjuster will operate only during reverse braking so that any adjustment which is rendered takes place when the brake is not overheated and thus the adjustment is accurate in amount.

The structural simplicity of this automatic adjuster creates an economy in manufacture. Another important item of cost is the price of installation and maintenance. It forms an important part of the invention that the adjuster can be installed with minimum difficulty and easily lends itself to various size brakes. Cumulative brake manufacturing tolerances do not affect installation of the adjuster; thus, there are no refined construction details which must be accounted for in equipping the brake with my invention.

It is another important feature of the invention that the brakes can be manually as well as automatically adjusted so that when the brake shoes are to be discarded, the adjuster can be manually reset to accommodate the replacement shoes.

It will be noted from the description of the invention that the parts of the adjuster are made mostly from stampings and this enables an inherent cost advantage in making the adjuster. Also, only a relatively few number of parts are involved in the adjuster and the parts are so located that the adjuster can be installed on a brake which is not especially made or originally adapted for the invention.

Other objects and features of the invention will become apparent from the following description which proceeds with reference to the accompanying drawings, wherein:

FIG. 1 is a plan view of a brake assembly embodying one form of this invention;

FIG. 2 is a fragmentary sectional elevational view taken along the line of and in the direction of the arrows 2—2 of FIG. 1;

FIG. 3 is another sectional elevational view taken along the line of and in the direction of the arrows 3—3 of FIG. 1;

FIG. 4 is an exploded perspective view of the brake adjuster actuating linkage utilized in the form of this invention shown in FIGS. 1–3;

FIG. 5 is a reduced size plan view of the brake assembly shown in FIG. 1 with the brake shoes being applied during a reverse drive operation so as to actuate the automatic shoe clearance adjusting mechanism;

FIG. 6 is a plan view of a brake assembly embodying a first modified form of this invention;

FIG. 7 is an exploded perspective view of the brake adjuster actuating linkage utilized in the FIG. 6 form of this invention;

FIG. 8 is a plan view of a brake assembly embodying a second modified form of this invention; and FIG. 9 is an exploded view of the brake adjuster actuating linkage utilized with the FIG. 8 form of this invention.

Referring first to the embodiment shown in FIGS. 1 through 5, the primary brake shoe 12 and secondary brake shoe 14 are applied to the surrounding brake drum 13 in any suitable manner as by means of a hydraulic wheel cylinder or the like 15 which acts against expandible ends 16 and 18 of the brake shoes. Each of the brake shoes is identically constructed and consists of a web 20, rim 22, and friction lining 24. The shoes are held against a backing plate 26 by means of hold down springs 28.

Both shoes anchor together as a unit at one or the other of the expandible ends 16 or 18 depending upon the direction of drum rotation. For example, when the drum is rotating in a counterclockwise direction for forward drive, as shown by arrow F in FIG. 1, the two shoes 12 and 14 anchor on anchor 30 which is provided at the end 18 of shoe 14. In this direction of braking, the brake shoe 12 is referred to as the "primary shoe" and shoe 14 acts as the "secondary shoe."

Between the articulated ends 32 of brake shoes 12 and 14 is an adjustable strut designated generally by reference numeral 34. The adjustable strut comprises a tubular internally threaded nut 36 and a socket 38 which receive threaded stem 42 and nonthreaded stem 44, respectively. The ends 46 of nut 36 and socket 38 are slotted to receive ends 32 of the brake shoes, thus preventing rotation of nut 36 and socket 38. A star wheel 48 is formed integrally with stem portions 42 and 44, and the irregularly shaped or toothed periphery 50 of the star wheel provides a ratchet surface for turning the wheel 48. Stem 44 is rotatably journaled in socket 38.

Extending between a hole 43 in the toe end of each brake shoe web portion 20 and the shoe anchor post 30 is a tension coil spring 46. The springs 46 yieldingly urge or retract the brake shoe toe ends 16, 18 against the anchor post 30 and also keep the shoe toe portions 21 in contact with the wheel cylinder plunger rods 27. Another tension spring 51 has one end hooked in the hole 52 in the heel portion of brake shoe 12. The other end of spring 51 is connected to the hook 53 on spring link 54 that has its opposite end hooked to the heel portion of brake shoe 14 by means of the shoe web hole 56. The link 54 extends through a U-shaped opening 57 in a tab 58 (see FIG. 4) that projects from the side of the actuator link 60. Link 60 will be hereinafter described. The spring 51 and the link 54 not only act on the adjuster mechanism actuating link 60 but their prime function is to hold the heel portions 32 of the brake shoes 12, 14 in abutting engagement with the opposite ends of the shoe adjuster strut assembly 34.

The brake assembly that has been described so far functions as a conventional servo-type brake wherein on pressurization of the double piston wheel cylinder 15 the cylinder plungers 27 expand the shoe toe portions 16, 18 radially outwardly to press the brake shoe linings 24 into contact with the surrounding rotatable brake drum 13. If the wheel drum 13 is rotating in a forwardly direction, as shown by arrow F of FIG. 1, then the shoe 12 is the primary shoe and it transmits braking force by servo action from its heel portion 32 through the adjuster strut 34 to the wheel portion 32 of the secondary shoe 14. The toe portion 18 of secondary shoe 14 will be forced back against the anchor pin 30 to provide the reaction point for the shoe braking action whereas the toe portion 16 of the primary shoe 12 will move farther away from the anchor pin 30 during braking action in forward drive. If the brakes are applied during reverse drive (see FIG. 5) then the shoe 14 is the primary shoe and the shoe 12 becomes the secondary shoe that is anchored at its toe end 16 to the anchor post 30. During reverse drive the drum 13 turns in the direction as shown by the arrow R in FIG. 5.

The structure of the novel automatic brake shoe adjuster mechanism will be described. This mechanism is composed of a minimum of simple, easily manufactured, inexpensive parts that can be readily applied to the conventional servo-type brake without modification thereof and without the use of any special tools or techniques. Because of its novel form, this adjusted can be added to existing servo-type brakes or installed as either original equipment or dealer applied accessory equipment at the time of purchase of the vehicle. Essentially this adjuster mechanism comprises a cam link 65, the actuator link 60 and the spring-link 51, 54. In addition to these elements, a camming pin 71 is added to the brake shoe 14 which pin is positioned for sliding cam movement in the cam slot 66 of the cam link 65. Cam link 65 also includes an aperture 68 through which the bent finger 61 of the actuator link 60 projects. Cam link 65 has an aperture 67 that is adapted to receive a journal portion 30a of the brake shoe anchor post 30.

The automatic brake shoe adjusting mechanism has the elongated actuator link 60 connected to the cam link 65 by the finger and slot connection 61, 68 at the upper end of link 60. The lower end of actuator link 60 includes the spring-link connector tab 58 at one side and the U-shaped notch 62 in the link lower end wall. Notch 62 engages the toothed periphery 50 of the adjuster strut star wheel 48.

With the arrangement heretofore described, it is thought to be obvious that when the brakes are applied while driving in a reverse direction (see FIG. 5), the brake shoe 14 will move clockwise away from the anchor post 30 so that the shoe toe end 18 is spaced from post 30. The clockwise movement of shoe 14 during reverse drive causes the shoe mounted camming pin 71 to move clockwise along the cam link slot 66 and in so doing to cam the link 65 upwardly or counterclockwise about its pivot post 30. This upward movement of the free end of the cam link 65 is transmitted to the actuator link 60 through the pin and slot connection 61, 68 between links 60, 65 so that the notched lower end 62 of the actuator link 60 is raised upwardly along at least one of the teeth of the toothed periphery 50 of the strut star wheel 48. If wear of the brake shoe linings 24 has developed to such an extent that the shoe 14 moves clockwise during a reverse drive brake application to such a degree that the notched end 62 of actuator link 60 moves upwardly over one full tooth of the strut star wheel periphery 50, then on release of the brakes the spring-link device 51, 54 will retract the actuator link 60 downwardly and in so doing the link notch 62 will rotate the star wheel 48 one notch to thereby cause the strut 34 to expand the distance between the heel ends 32 of the brake shoes 12, 14 and automatically adjust the brake shoe mechanism to compensate for shoe lining wear. Because this automatic brake adjusting mechanism operates during reverse drive braking where vehicle movement is usually from a standing start and at relatively low vehicle speeds there is no problem of overadjustment as might occur during a forward drive adjustment when overheating of the brakes expands the drum or shoes, or where high speed braking causes hooping of the drum or inertia shoe movements that are not a true measure of lining wear. Such conditions might give a brake adjustment during forward drive actuation of the adjuster that would be based on unnatural or exceptional conditions that did not actually require shoe adjustments for lining wear.

Another advantage of this automatic brake adjuster mechanism is that it does not interfere with or alter the manner of making a manual brake adjustment which is merely to rotate the star wheel 50 by using a pointed tool such as a screwdriver inserted through an opening 27 in the backing plate 26 adjacent the star wheel 48. The notched end 62 of the actuator link 60 can be held out of contact with the star wheel 48 during a manual brake adjustment.

FIGS. 6 and 7 show a modified form of this invention wherein the elements 160, 165, 90, 151 of the automatic shoe adjusting mechanism differ somewhat from their corresponding elements 60, 65, 51, 54 in the FIGS. 1–5 form of the invention even though they operate in a similar manner in most respects. All parts that are common to the several forms of this invention herein disclosed bear the same reference numerals.

In the FIGS. 6 and 7 form the cam link 165 (see FIG. 7) has an anchor pin receiving aperture 167 and a camming notch 166 that is engaged by the cam pin 71 on the brake shoe 14. Cam link 165 also has a slot 168 that serves to interconnect the cam link 165 to the actuator link 160 when the tab or bent finger 161 of the actuator link 160 is seated in the cam link slot 168.

Actuator link 160 may be of channel-like cross section to add link rigidity if necessary. The upper end of link 160 has a downwardly extending bent tab 161 that extends through the slot 168 in cam link 165 so that the oscillatory movement of cam link 165 about pin 30 during reverse drive braking movement of brake shoe 14 will transmit an up and down movement to actuator link 160. At some intermediate point along the length of actuator link 160 a hole or tab 164 is formed to provide a means to anchor one end of a tension spring 90. The opposite end of the tension spring 90, that extends lengthwise of the link 160, is anchored to the brake shoe 14 by means of a hole 91 in the shoe web portion 20. It is clear that the spring 90 will continuously act to pull the actuator link 160 and the cam link 165 downwardly or clockwise with respect to the anchor pin 30.

The lower end of actuator link 160 is provided with an offset foot portion 160a that terminates in a U-shaped notch 162 adapted to seat on and straddle the star wheel 48 of the adjuster strut 34. It is thought to be obvious from the preceding description of the FIGS. 1–5 form of the invention that this FIG. 6 and FIG. 7 form operates in a similar manner to rotate the star wheel 48 for strut elongation whenever brake shoe lining wear is such as to cause the bight portion edge of the U-shaped slot 162 to pass over one full tooth 50 of the star wheel 48 during a reverse drive brake application.

The FIGS. 6 and 7 form of the invention differs from the FIGS. 1–5 form by having a separate tension spring 151 connected between the apertures 52 and 56 in the heel portions of the brake shoes 12 and 14 respectively to hold the shoe heel end portions 32 in engagement with the strut adjuster elements 36, 38. While the spring link 51, 54 of the FIGS. 1–5 form lets the spring 51 serve a dual function, still, the separate springs 151, 90 of the FIGS. 6 and 7 form of the invention permit more flexibility in control of the adjusting mechanism and has certain advantages over the FIGS. 1–5 form.

Another advantage of the FIGS. 6 and 7 form is the addition of the rearwardly extending, U-shaped, adjusting and guide portion 163 that straddles the threaded adjuster strut stem 42. Guide 163 prevents the lower end of the actuator link 160 from becoming disengaged from the strut mechanism 34 during actuating up-and-down reciprocation of the link 160. The guide portion yoke 163 cooperates with the return spring 90 to keep the notch 162 positioned for automatic lining wear adjusting action. Furthermore, the rearwardly extending leg of the U-shaped yoke 163 provides a projection that can be readily engaged by a screwdriver end inserted through the backing plate opening 27 (see FIG. 3) to lift the actuator link notch 162 up off the star wheel 48 to permit manual adjustment of the brake shoe lining clearance by rotation of the strut star wheel 48.

FIGS. 8 and 9 show a third form of this invention wherein parts common to the several forms bear the same reference numerals. In this form of the invention the cam link of the previously described forms is replaced with a bell crank lever 265 that is pivotally supported on pin 266 carried by the web 20 of the brake shoe 12. One leg 265a of bell crank 265 is connected by a rod or cable-type link 267 to the fixed anchor pin 30. The other leg 265b of the bell crank lever 265 is notched at 269 to receive the offset tab 261 at the top end of the actuator link 260. The lower end of the actuator link 260 is formed with a blade-like edge 262 that is adapted to seat in the notches between the tooth-like formations on the periphery 50 of the star wheel 48 (see FIG. 3). The lower end of the actuator link 260 also includes an offset leg 263 that straddles the adjuster strut and extends downwardly behind it so that it can be engaged by a screwdriver or similar tool inserted through the opening 27 in the backing plate 26 when it is desired to make a manual brake adjustment.

A tension spring 290 is connected between the aperture 291 in the actuator link 260 and the aperture 52 in the heel portion of the brake shoe 12. This spring acts to urge the actuator link 260 downwardly to cause rotation of the star wheel 48 after a predetermined amount of brake shoe lining wear. The tension spring 251 that extends between the openings 87 and 56 in the heel portions of the brake shoes 12 and 14 respectively, urges the shoe heel edges 32 into engagement with the opposite ends of the actuator strut 34.

Operation of the form of this invention shown in FIGS. 8 and 9 is thought to be rather obvious from the explanation of the other forms of this invention shown respectively in FIGS. 1–5 and 6 and 7. In the FIGS. 8 and 9 form, when the brake shoes 12, 14 are applied during reverse drive, the shoe 12 will move counterclockwise away from the anchor pin 30. Such counterclockwise movement of shoe 12 will cause the link 267 to rotate the bellcrank 265 in a counterclockwise direction about its pivot pin connection 266 to the brake shoe web 20. Counterclockwise rotation of the bellcrank 265 will move its leg portion 265b upwardly and thereby pull the actuator link 260 upwardly so that its lower end edge 262 will move upwardly along the toothed periphery of the star wheel 48 of the adjusting strut 34. On release of the brake applying pressure, the spring 290, which has been tensioned during brake application, will then pull the actuator link 260 downwardly and in so doing will cause the link edge portion 262 to move across more than one tooth of the star wheel during its reciprocatory movement in a reverse drive brake application.

While the form of the invention shown in FIGS. 8 and 9 has one more element than that shown in FIGS. 6 and 7, still, it does avoid the use of a camming pin and notch that can be a source of wear problems unless the material thereof is carefully selected. The FIGS. 8 and 9 form of the invention uses a separate spring for actuator link return movement so this form of the invention has the control flexibility of the FIGS. 6 and 7 form.

I claim:

1. In a brake having a support plate with an anchor post thereon extending normal thereto, a pair of arcuate, annularly arranged, brake shoes each having one pair of adjacent ends abuttingly engaged with said anchor post and the other pair of adjacent ends interconnected by an extensible strut member, a toothed wheel on said strut member rotatable to vary the effective length of said strut member, means to radially expand and retract said brake shoes in a plane parallel to said support plate, an oscillatable cam link pivotally connected to said anchor post for rockable movement in the plane of and relative to said brake shoes, said cam link having a pin and slot connection to one of said brake shoes adjacent the anchor post end thereof providing for cam link actuation by braking movement of said one brake shoe, an actuator link connected to said cam link at one end and having the other end extending in the plane of the toothed wheel and shaped to provide an edge portion in ratchet engagement with the toothed wheel of the strut member and arranged such that substantially vertical reciprocation of said actuator link will effect rotation of said wheel to automatically adjust said brake shoes relative to a shoe engageable brake drum arranged to surround said shoes, and resilient means connected between one of said brake shoes and said actuator link to urge said actuator link towards said wheel to effect rotation thereof.

2. In a brake having a support plate with an anchor post thereon extending normal thereto, a pair of arcuate, annularly arranged, brake shoes each having one pair of adjacent ends abuttingly engaged with said anchor post and the other pair of adjacent ends interconnected by an extensible strut member, a toothed wheel on said strut member rotatable to vary the effective length of said strut member, means to radially expand and retract said brake shoes in a plane parallel to said support plate, an oscillatable cam link pivotally connected to said anchor post for rockable movement in the plane of and relative to said brake shoes, said cam link having a pin and slot connection to one of said brake shoes adjacent the anchor post end thereof providing for cam link actuation by braking movement of said one brake shoe, an actuator link connected to said cam link at one end and having the other end extending in the plane of the toothed wheel and shaped to provide an edge portion in ratchet engagement with the toothed wheel of the strut member and arranged such that substantially vertical reciprocation of said actuator link will effect rotation of said wheel to automatically adjust said brake shoes relative to a shoe engageable brake drum arranged to surround said shoes, said other end of said actuator link having a finger portion thereon to provide means for disengaging said actuator link from said strut wheel to facilitate manual adjustment of said brake shoes, and resilient means connected between said one of said brake shoes and said actuator link to urge said actuator link towards said wheel to effect rotation thereof.

3. In a brake having a support plate with an anchor post thereon extending normal thereto, a pair of arcuate, annularly arranged, brake shoes each having one pair of adjacent ends abuttingly engaged with said anchor post and the other pair of adjacent ends interconnected by an extensible strut member, a toothed wheel on said strut member rotatable to vary the effective length of said strut member, means to radially expand and retract said brake shoes in a plane parallel to the support plate, an oscillatable cam link pivotally connected to said anchor post and overlying and being rockable relative to the adjacent end of one of said brake shoes, said cam link having a pin and slot connection to the underlying one of said brake shoes adjacent the anchor post end thereof providing for cam link actuation by braking movement of said one brake shoe, an actuator link connected to said cam link at one end and having the other end shaped to provide an edge portion in engagement with the toothed wheel of the strut member and arranged such that substantially vertical reciprocation of said actuator link will effect rotation of said wheel to automatically adjust said brake shoes relative to a shoe engageable brake drum arranged to surround said shoes, said other end of said actuator link having a yoke portion straddling said extensible strut member and providing means to manually disengage the actuator link from the strut adjusting wheel, and resilient means connected between one of said brake shoes and said actuator link to urge said actuator link towards said wheel to effect rotation thereof.

4. In a brake having a support plate with an anchor post thereon extending normal thereto, a pair of arcuate, annularly arranged, brake shoes each having one pair of adjacent ends abuttingly engaged with said anchor post and the other pair of adjacent ends interconnected by an extensible strut member, a toothed wheel on said strut member rotatable to vary the effective length of said strut member, means to radially expand and retract said brake shoes in a plane parallel to said support plate, an oscillatable cam link pivotally connected to said anchor post and overlying the anchor post end of one of said brake shoes, said cam link having a pin and slot connection to the underlying end of said one of said brake shoes providing for cam link actuation by braking movement of said one brake shoe, an actuator link connected to said cam link at one end and extending therefrom to said strut member, said actuator link having the other end extending in the plane of the toothed wheel and shaped to provide an edge portion in engagement with the toothed wheel of the strut member and arranged such that cam link effected reciprocation of said actuator link will effect rotation of said wheel to automatically adjust said brake shoes relative to a shoe engageable brake drum arranged to surround said shoes, and resilient means connected between one of said brake shoes and said actuator link to urge said actuator link towards said wheel to effect rotation thereof, said resilient means extending substantially lengthwise of said actuator link.

5. In a brake having a support plate with an anchor post thereon extending normal thereto, a pair of arcuate, annularly arranged, brake shoes each having one pair of adjacent ends abuttingly engaged with said anchor post and the other pair of adjacent ends interconnected by an extensible strut member, a toothed wheel on said strut member rotatable to vary the effective length of said strut member, means to radially expand and retract said brake shoes in a plane parallel to the support plate, an oscillatable cam link pivotally connected to said anchor post and overlying the anchor post end of one brake shoe for movement in a plane parallel to the support plate, said cam link having a pin and slot connection to the underlying end of said one of said brake shoes adjacent the anchor post and providing for cam link actuation by braking movement of said one brake shoe, an actuator link connected to said cam link at one end and having the other end extending in the plane of the toothed wheel and shaped to provide an edge portion in engagement with the toothed wheel of the strut member and arranged such that cam link effected reciprocation of said actuator link will effect rotation of said wheel to automatically adjust said brake shoe relative to a shoe engageable brake drum arranged to surround said shoes, and resilient means connected between said one of said brake shoes and said actuator link to urge said actutor link towards said wheel to effect rotation thereof, said resilient means extending substantially lengthwise of said actuator link, and other resilient means extending between and urging said other pair of ends of said brake shoes into engagement with said extensible strut member.

References Cited in the file of this patent

UNITED STATES PATENTS

| | | |
|---|---|---|
| 2,264,454 | Para | Dec. 2, 1941 |
| 2,301,272 | Goepfrich | Nov. 10, 1942 |
| 2,762,463 | Brooks | Sept. 11, 1956 |
| 2,938,610 | Dombeck et al. | May 31, 1960 |
| 2,978,072 | Burnett | Apr. 4, 1961 |
| 3,010,544 | Dahle et al. | Nov. 28, 1961 |